(12) United States Patent
Nakano et al.

(10) Patent No.: US 9,509,883 B2
(45) Date of Patent: Nov. 29, 2016

(54) PRINTED MATTER, PRINTED MATTER INSPECTION DEVICE, MANUFACTURING METHOD OF PRINTED MATTER, AND MANUFACTURING DEVICE OF PRINTED MATTER

(71) Applicant: Kabushiki Kaisha Toshiba, Tokyo (JP)

(72) Inventors: Takahisa Nakano, Kanagawa-ken (JP); Fumitoshi Morimoto, Fukushima-ken (JP); Takeo Miki, Tokyo (JP); Shota Kure, Kanagawa-ken (JP); Nobuki Nemoto, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 170 days.

(21) Appl. No.: 14/230,080

(22) Filed: Mar. 31, 2014

(65) Prior Publication Data
US 2014/0294230 A1 Oct. 2, 2014

(30) Foreign Application Priority Data
Apr. 1, 2013 (JP) .................. 2013-076297

(51) Int. Cl.
| | |
|---|---|
| G06K 9/00 | (2006.01) |
| H04N 1/32 | (2006.01) |
| B41J 2/435 | (2006.01) |
| B42D 15/00 | (2006.01) |
| G06T 1/00 | (2006.01) |
| B42D 25/00 | (2014.01) |
| G07D 7/12 | (2016.01) |

(Continued)

(52) U.S. Cl.
CPC .......... *H04N 1/32341* (2013.01); *B41J 2/435* (2013.01); *B42D 15/00* (2013.01); *B42D 25/00* (2014.10); *G06T 1/0021* (2013.01); *G07D 7/122* (2013.01); *G07D 7/20* (2013.01); *G07D 7/205* (2013.01); *G07D 7/2058* (2013.01); *B41M 3/14* (2013.01); *B41M 3/144* (2013.01); *B42D 25/382* (2014.10)

(58) Field of Classification Search
USPC ......................................... 382/100
See application file for complete search history.

(56) References Cited

U.S. PATENT DOCUMENTS

| | | | |
|---|---|---|---|
| 6,180,312 B1 * | 1/2001 | Edwards | .................. G03C 7/24 430/140 |
| 2004/0002022 A1 * | 1/2004 | Ii | .......................... G03C 7/3022 430/375 |

(Continued)

FOREIGN PATENT DOCUMENTS

| | | |
|---|---|---|
| EP | 1449674 A1 | 8/2004 |
| JP | 2005161792 A | 6/2005 |

(Continued)

OTHER PUBLICATIONS

Office Action issued in related Korean Patent Application No. 10-2014-37617, mailed on May 29, 2015 (19 pages w/ translation).

(Continued)

*Primary Examiner* — Yon Couso
(74) *Attorney, Agent, or Firm* — Baker Botts L.L.P.

(57) ABSTRACT

A printed matter includes: a first sub image embedded in the main image which has the same color as a color of the main image in a human visual sense, and is printed with an ink to absorb light of an infrared wavelength band by a first absorption coefficient; and a second sub image embedded in the main image which has the same color as the color of the main image in a human visual sense, and is printed with an ink to absorb the light of the infrared wavelength band by a second absorption coefficient.

2 Claims, 9 Drawing Sheets

(51) Int. Cl.
*G07D 7/20* (2016.01)
*B41M 3/14* (2006.01)
*B42D 25/382* (2014.01)

(56) References Cited

U.S. PATENT DOCUMENTS

2004/0245343 A1 12/2004 Depta
2004/0255808 A1* 12/2004 Nagashima ............ B42D 25/29
  101/491
2005/0067489 A1 3/2005 Jones et al.

FOREIGN PATENT DOCUMENTS

JP 2011178009 9/2011
JP 2011152652 11/2011
JP 2012022455 A 2/2012

OTHER PUBLICATIONS

Extended European Search Report issued in related European Patent Application No. 14162705.9 mailed Aug. 22, 2014, 8 pages.

* cited by examiner

PRINTED MATTER, PRINTED MATTER INSPECTION DEVICE, MANUFACTURING METHOD OF PRINTED MATTER, AND MANUFACTURING DEVICE OF PRINTED MATTER

CROSS-REFERENCE TO RELATED APPLICATION

This application is based upon and claims the benefit of priority from the prior Japanese Patent Application No. 2013-076297, filed on Apr. 1, 2013, the entire contents of which are incorporated herein by reference.

FIELD

Embodiments of the present invention relate to a printed matter, a printed matter inspection device, a manufacturing method of a printed matter, and a manufacturing device of a printed matter.

BACKGROUND

Issuing devices to issue a medium for authenticating a person, such as a license and an ID card, are known. An issuing device prints various information on a printable base material, such as paper, plastic, to issue a personal authentication medium. In addition, in order to prevent forgery, there are a medium on which various security printing has been performed, and an issuing device to perform various security printing.

There is a method to embed a sub image (sub information) into a main image (main information) with a digital watermark. However, in such a method, there is a possibility that the image quality of the main image deteriorates. It has been desired to embed the sub image without deteriorating the image quality of the main image.

DETAILED DESCRIPTION

A printed matter according to an embodiment is a printed matter in which a main image is printed on a base material, and is provided with a first sub image embedded in the main image which has the same color as a color of the main image in a human visual sense, and is printed with an ink to absorb light of an infrared wavelength band by a first absorption coefficient, and a second sub image embedded in the main image which has the same color as the color of the main image in a human visual sense, and is printed with an ink to absorb the light of the infrared wavelength band by a second absorption coefficient.

Embodiment 1

Hereinafter, a printed matter, and a printed matter inspection device according to the first embodiment 1 will be described with reference to the drawings.

Figure 1:
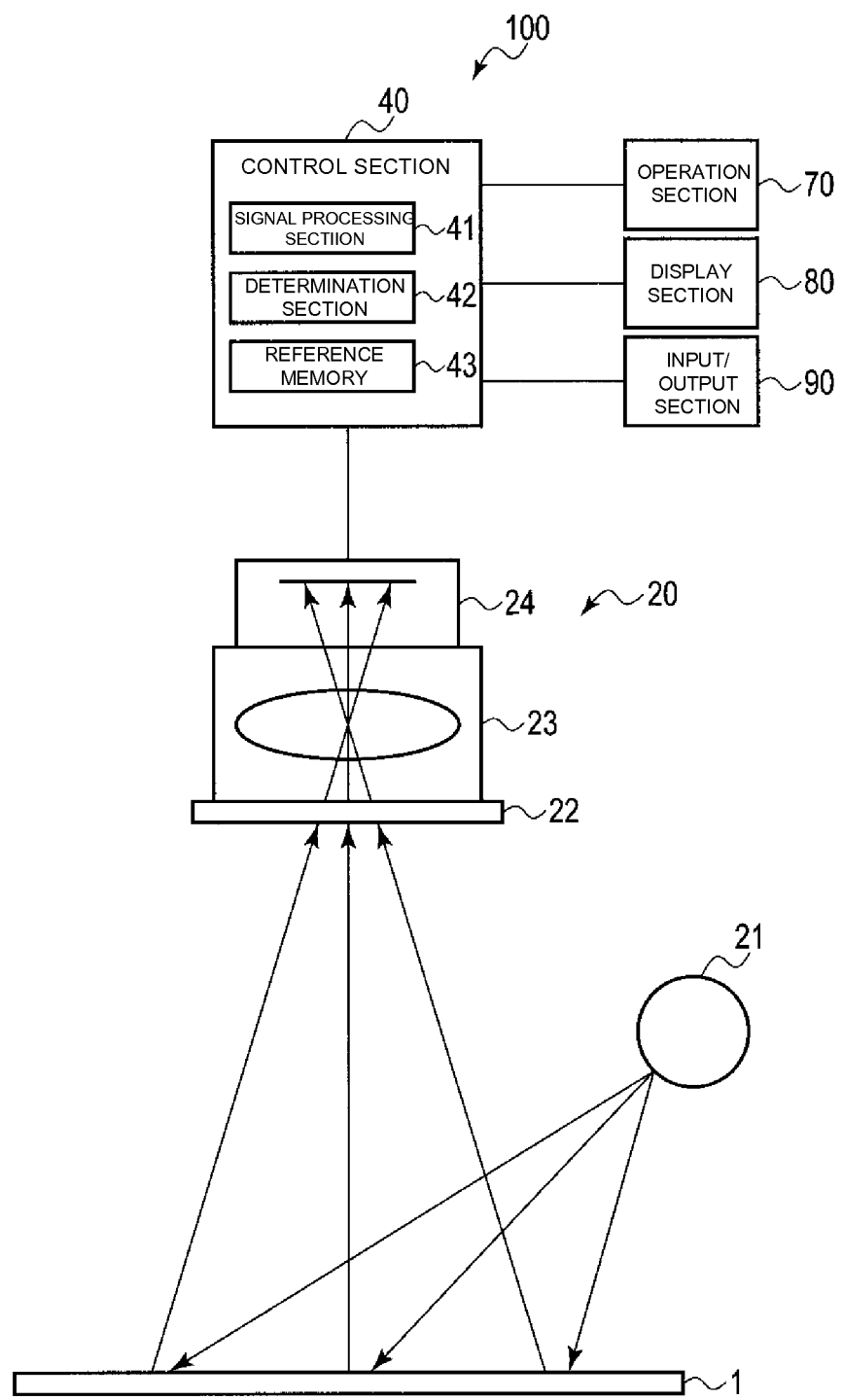
FIG. 1 is a diagram for describing a printed matter inspection device according to a first embodiment.

To begin with, a printed matter inspection device will be described. FIG. 1 shows an example of a printed matter inspection device 100 according to the embodiment 1.

The printed matter inspection device 100 is a device to determine authenticity of a medium (printed matter) 1 for personal authentication in which personal information and so on are printed on a printable sheet-like base material, such as a paper, a plastic, a film.

As shown in FIG. 1, the printed matter inspection device 100 is provided with an image reading section 20, a control section 40, an operation section 70, a display section 80, and an input/output section 90.

The image reading section 20 obtains an image from the medium 1. The image reading section 20 is provided with a lighting 21, a band pass filter 22, an optical system 23, and a sensor 24, for example.

The lighting 21 irradiates the medium 1 with infrared light (infrared ray). The lighting 21 is provided with an LED to emit infrared light, a combination of a fluorescent lamp and a filter to transmit infrared light, or another light source. The lighting 21 irradiates the medium 1 with light of a near infrared wavelength (800 to 2500 nm, for example).

The band pass filter 22 transmits light of a specific wavelength, and shields light of another wavelength. For example, the band pass filter 22 is provided with a dielectric multilayer film which transmits light of an infrared wavelength, and shields light of another wavelength. That is, the band pass filter 22 is a filter which transmits light of a wavelength corresponding to a wavelength of the light emitted from the lighting 21. By this means, the band pass filter 22 can suppress the influence of disturbance light.

The optical system 23 forms an image of the incident light on a light receiving element of the sensor 24. The optical system 23 is provided with a lens, a light guide member, and so on. The optical system 23 can forms an image of light from an image angle including the whole medium 1 on the sensor 24.

The sensor 24 converts the incident light into an electrical signal that is an image. The sensor 24 is provided with a configuration in which a plurality of light receiving elements, such as Charge Coupled Devices (CCD), Complementary Metal Oxide Semiconductors (CMOS) are arranged. The light receiving element converts the incident light into an electrical signal, that is, an image. In addition, the sensor 24 is an area image sensor in which a plurality of light receiving elements capable of detecting light of an infrared wavelength (IR) are two-dimensionally arranged. That is, the sensor 24 can obtain a two-dimensional image.

With the configuration like this, the image reading section 20 can obtain an image from the light which is emitted from the lighting 21, is reflected at the surface of the medium 1, and enters into the sensor 24 through the band pass filter 22 and the optical system 23. By this means, the image reading section 20 can obtain an image of the whole surface of the medium 1. The image reading section 20 inputs the obtained image of the medium 1 into the control section 40.

The control section 40 integrally controls the operations of the respective sections of the printed matter inspection device 100. The control section 40 is provided with a CPU, a random access memory, a program memory, a non-volatile memory, and so on. The CPU performs various calculation processing. The random access memory temporarily stores the result of the calculation performed by the CPU. The program memory and the non-volatile memory store the various programs which the CPU executes, the control data, and so on. The control section 40 executes the program stored in the program memory by the CPU, and thereby can perform various processing.

For example, the control section 40 executes the program by the CPU, to function as a signal processing section 41, and a determination section 42. In addition, the non-volatile memory of the control section 40 functions as a reference memory 43 which previously stores various determination references used for the references of determination by the determination section 42.

The signal processing section 41 performs signal processing to the image of the medium 1 supplied from the image reading section 20. For example, the signal processing section 41 performs signal processing to the image of the medium 1, and thereby can obtain various feature amounts. For example, the signal processing section 41 performs amplification of a signal, emphasis of the edges, adjustment of brightness, and so on, and thereby can generate a determination image or the feature amount used for various determination.

The determination section 42 compares the determination image or the feature amount generated in the signal processing section 41 with the determination reference stored in the reference memory 43, and determines the authenticity of the medium 1, based on the comparison result. For example, when an image (a reference image) as a reference is stored in the reference memory 43, the determination section 42 compares the determination image generated in the signal processing section 41 with the reference image stored in the reference memory 43, and determines the authenticity of the medium 1, based on the comparison result. In addition, when a feature amount (a reference feature amount) as a reference is stored in the reference memory 43, the determination section 42 compares the feature amount generated in the signal processing section 41 with the reference feature amount stored in the reference memory 43, and determines the authenticity of the medium 1, based on the comparison result.

The operation section 70 accepts various operation inputs by an operator who operates the printed matter inspection device 70. The operation section 70 generates an operation signal based on the operation inputted by the operator, and transmits the generated operation signal to the control section 40. The display section 80 displays various screens based on the control of the control section 40. For example, the display section 80 displays various operation guides, the processing result, and so on, to the operator. In addition, the operation section 70 and the display section 80 may be formed integrally as a touch panel.

The input/output section 90 performs data transmission and reception to and from an external device, or a storage medium connected to the printed matter inspection device 100. For example, the input/output section 90 is provided with a disk drive, a USB connector, a LAN connector, other interface capable of data transmission and reception, or the like. The printed matter inspection device 100 can obtain data from the external device, or the storage medium connected to the input/output section 90. In addition, the printed matter inspection device 100 can also transmit the processing result to the external device, or the storage medium connected to the input/output section 90.

Figure 2:
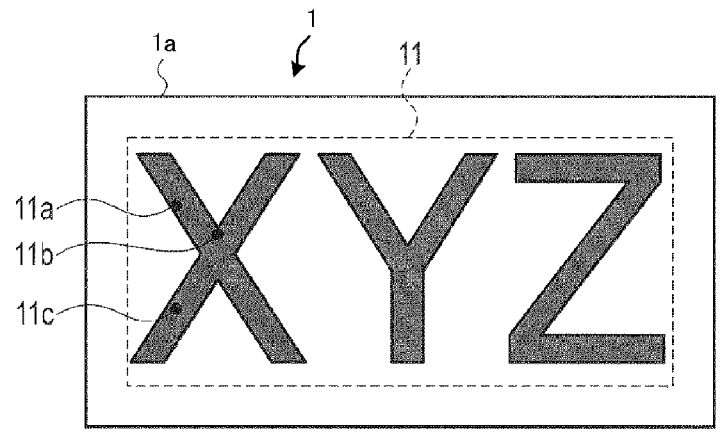
FIG. 2 is a diagram for describing a printed matter according to the first embodiment.
Figure 3:
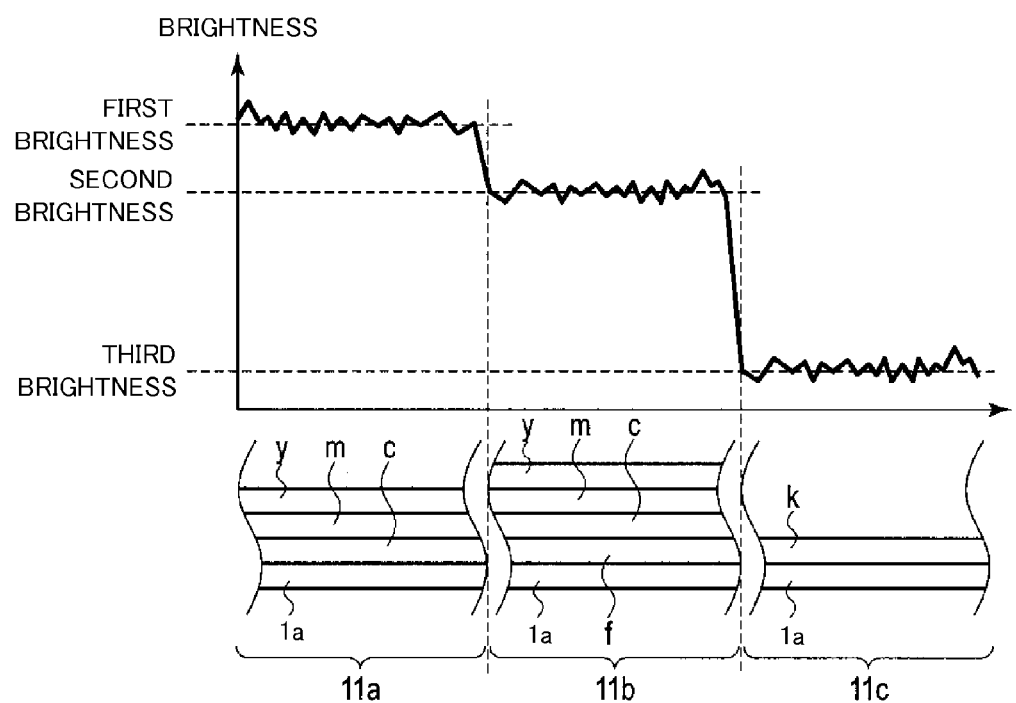
FIG. 3 is a diagram for describing the printed matter according to the first embodiment.

Next, the medium 1 that is a printed matter will be described. FIG. 2 and FIG. 3 show an example of the medium 1. The medium 1 has a printable sheet-like base material 1a such as a paper, a plastic, and a print 11 printed on the base material 1a. The print 11 has a pattern which looks to be a black color in a human visual sense, for example. In addition, here, a pattern which looks to be a black color in a human visual sense is referred to as a main image (main information). A first sub image and a second sub image are embedded in the main image. The surface of the base material 1a reflects light of a near infrared wavelength band.

A pattern of the print 11 is expressed by superimposing various inks on the base material 1a. For example, in an area 11a, as shown in FIG. 3, a black color is expressed by superimposing an ink y of a yellow color that is a first color, an ink m of a magenta color that is a second color, and an ink c of a cyan color that is a third color. The cyan ink c, the magenta ink m, and the yellow ink y are superimposed in this order from the medium 1 side. The cyan ink c, the magenta ink m, and the yellow ink y are visible inks.

For example, in an area 11b, as shown in FIG. 3, a black color is expressed by superimposing the ink y of the yellow color that is the first color, the ink m of the magenta color that is the second color, the ink c of the cyan color that is the third color, and a fluorescent ink f. The fluorescent ink f, the cyan ink c, the magenta ink m, and the yellow ink y are superimposed in this order from the medium 1 side. In addition, here, the pattern which is expressed by superimposing the ink y, the ink m, the ink c and the fluorescent ink f is referred to as a first sub image (first sub information). The fluorescent ink f is an ink which absorbs light of a near infrared wavelength band, is excited to emit light.

The fluorescent ink f absorbs of the energy of the irradiated light, and thereby electrons in the fluorescent ink f are excited. In addition, when returning from an excited state to a ground state, the electrons in the fluorescent ink f emit excess energy as light, heat or the like.

In addition, other infrared light which has entered into the fluorescent ink f is reflected by the fluorescent ink f or the base material 1a. This reflected light becomes weaker than that a strength at the incident time by only the portion absorbed by the fluorescent ink f.

For example, in an area 11c, as shown in FIG. 3, a black color is expressed by applying an ink k of a black color containing carbon that is a fourth color to the medium 1. In addition, here, the pattern which is expressed by the ink k is referred to as a second sub image (second sub information). The black ink k containing carbon has characteristic to absorb light of a near infrared wavelength band. In addition, the ink k has characteristic that an absorption coefficient of light of a near infrared wavelength band is higher, compared with the fluorescent ink f.

Figure 4:
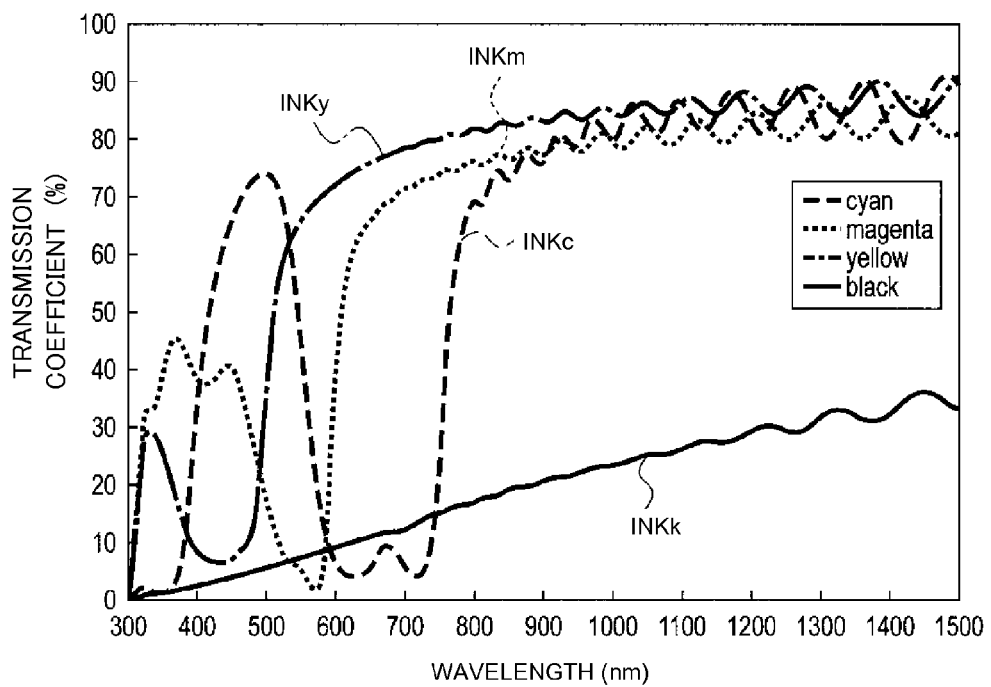
FIG. 4 is a diagram for describing the printed matter according to the first embodiment.
Figure 5:
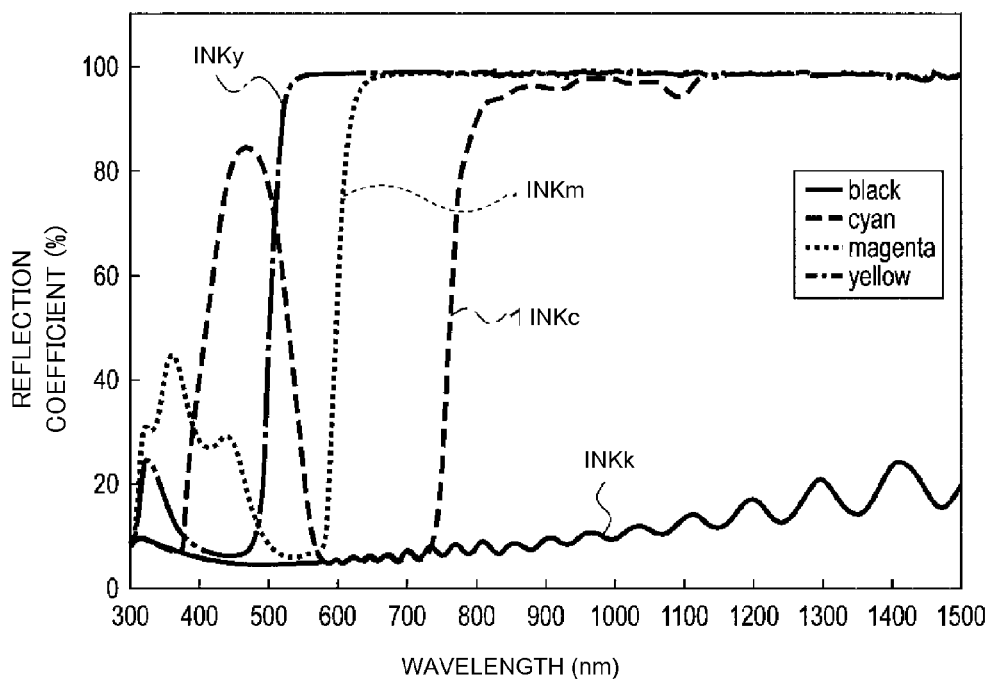
FIG. 5 is a diagram for describing the printed matter according to the first embodiment.

FIG. 4 shows an example of wavelength-transmission coefficient characteristics of each of the ink y, the ink m, the ink c, and the ink k. In addition, FIG. 5 shows an example of wavelength-reflection coefficient characteristics, when each of the ink y, the ink m, the ink c, and the ink k is directly applied to the base material 1a.

As shown in FIG. 4, the ink y, the ink m, and the ink c, have higher transmission characteristics compared with the ink k, in a near infrared band (800 to 2500 nm, for example). For this reason, in the area 11a of FIG. 3, the infrared light irradiated from the lighting 21 transmits the layers of the ink y, the ink m, and the ink c, and is reflected at the base material 1a. For this reason, when imaging the area 11a, the image reading section 20 of the printed matter inspection device 100 detects a first brightness.

In addition, in the area 11b, the infrared light irradiated from the lighting 21 transmits the layers of the ink y, the ink m, and the ink c, and enters into the fluorescent ink f. The fluorescent ink f absorbs the light of a near infrared wavelength band and is excited, to emit light. Other infrared light which has entered into the fluorescent ink f is reflected by the fluorescent ink f or the base material 1a. When imaging the area 11b, the image reading section 20 detects a second brightness which is darker than the first brightness. In addition, the difference between the first brightness and the second brightness is due to the infrared light absorbed by the fluorescent ink f.

In the area 11c of FIG. 3, the infrared light irradiated from the lighting 21 enters into the layer of the ink k. Because the ink k absorbs the incident infrared light, the reflection coefficient of the infrared light is low, as shown in FIG. 5. In addition, the ink k has characteristics that the absorption coefficient of a near infrared wavelength band is higher compared with the fluorescent ink f. For this reason, when imaging the area 11c, the image reading section 20 detects a third brightness which is darker than the second brightness.

That is, the image reading section 20 can recognize the pattern detected by the second brightness as the first sub image, and can recognize the pattern detected by the third brightness as the second sub image.

Figure 6:
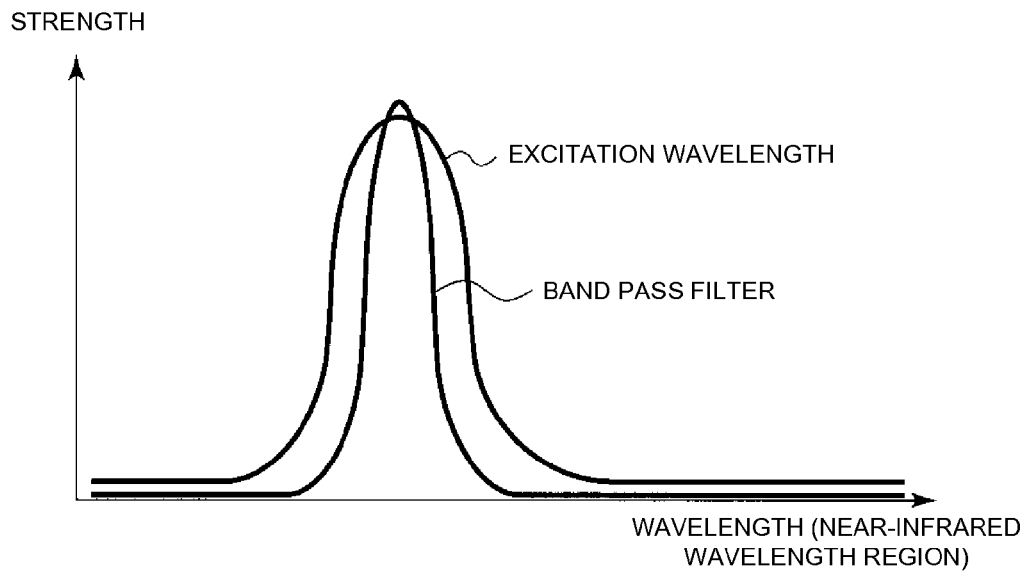
FIG. 6 is a diagram for describing the printed matter according to the first embodiment.

In addition, the lighting 21 of the image reading section irradiates the medium 1 with infrared light of a wavelength capable of exciting the fluorescent ink f. In addition, the band pass filter 22 of the image reading section 20 transmits light of an infrared wavelength, and shields light of other wavelength. For example, the band pass filter 22 has transmission characteristics as shown in FIG. 6. That is, as for the band pass filter 22, it is preferable to have the characteristics coinciding with the characteristics of the light (light of the excitation wavelength) irradiated to the medium 1, or the characteristics with shaper edge than the light of the excitation wavelength. According to the characteristics like this, since the band pass filter 22 can shield the light except the reflected light of the excitation band of the fluorescent ink f, it is possible to improve S/N ratio of the brightness level.

Figure 7:
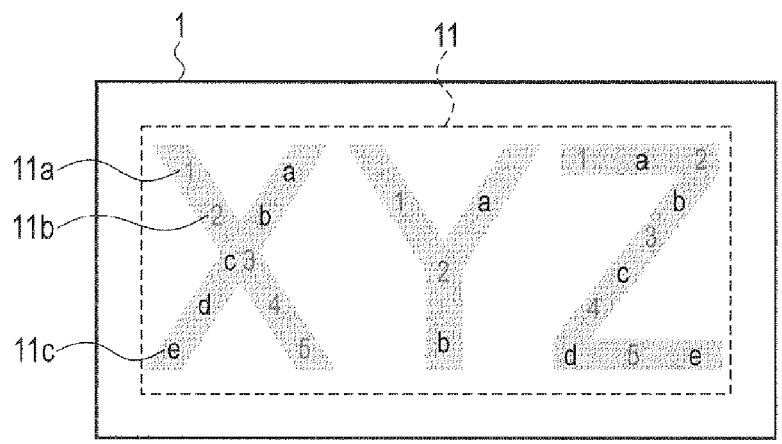
FIG. 7 is a diagram for describing the printed matter according to the first embodiment.

FIG. 7 shows an example of an image of the medium 1 obtained by the image reading section 20. As shown in FIG. 7, the area 11a is imaged with approximately the same brightness as a brightness of an area where printing is not performed. In addition, the area 11b is imaged more darkly than the area 11a, and more brightly than the area 11c. Here, the area 11b is an area in which numerical characters (1, 2, 3, 4, 5) are printed. In addition, the area 11c is imaged more darkly than the area 11b. Here, the area 11c is an area in which alphabetical characters (a, b, c, d, e) are printed.

In this manner, the medium 1 has the main image (characters: X, Y, Z) which looks to be a black color in a human visual sense, the first sub image (numerical characters: 1, 2, 3, 4, 5) which is imaged with the second brightness when imaged with infrared light, and the second sub image (characters: a, b, c, d, e) which is imaged with the third brightness when imaged with infrared light.

In addition, the image reading section 20 can obtain the first sub image and the second sub image from the medium 1 at the same time. Thereby, with a simple configuration, the printed matter inspection device 100 can obtain a plurality of sub information from the medium 1 at the same time. In addition, in the medium 1 with the above-described configuration, the first sub image and the second sub image are expressed to be a black color in a human visual sense. That is, the medium 1 has the first sub image and the second sub image which are expressed without deteriorating the image quality of the main image.

In addition, the main image may be black solid printing in a visual sense, or may be a print pattern such as a character. For example, when the main image is a pattern of a character and so on, the first sub image and the second sub image become less distinct.

Next, determination of the authenticity of the medium 1 by the printed matter inspection device 100 will be described. The image reading section 20 inputs the image shown in FIG. 7, that is the image having the first sub image and the second sub image, into the control section 40.

The reference memory 43 of the control section 40 previously stores a first threshold value and a second threshold value for respectively extracting the first sub image and the second sub image, for example.

Figure 8:
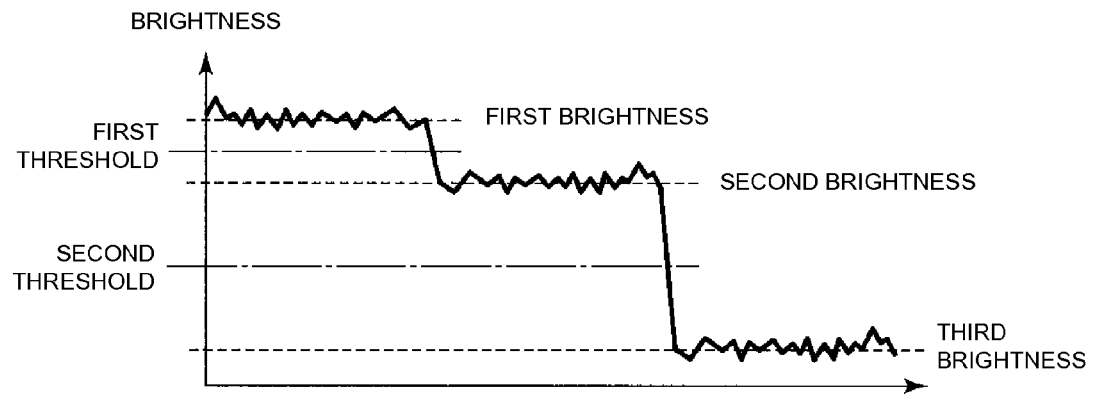
FIG. 8 is a diagram for describing the printed matter according to the first embodiment.

For example, as shown in FIG. 8, it is assumed that the first threshold value is set between the first brightness and the second brightness, and the second threshold value is set between the second brightness and the third brightness. In this case, the signal processing section 41 can extract each of the first sub image and the second sub image using the first threshold value and the second threshold value. That is, the signal processing section 41 extracts an image with brightness between the first threshold value and the second threshold value, and thereby can extract the first sub image. In addition, the signal processing section 41 extracts an image with brightness less than the second threshold value, and thereby can extract the second sub image.

In addition, the reference memory 43 may have a configuration to previously store a reference image (first reference image) for comparing with the first sub image, and a reference image (second reference image) for comparing with the second sub image, respectively. In this case, the determination section 42 can determine the authenticity of the medium 1, based on the comparison result between the first sub image and the first reference image, and the comparison result between the second sub image and the second reference image. By this means, the printed matter inspection device 100 can determine the authenticity of the medium 1 with higher accuracy.

In addition, in the above-described embodiment, it has been described that the reference memory 43 has the configuration to previously store the first threshold value and the second threshold value, but the reference memory 43 is not limited to this configuration. The control section 40 may have a configuration to calculate a histogram as a feature amount based on the images supplied from the image reading section 20, and to thereby determine the first threshold value and the second threshold value using the calculated histogram.

Figure 9:
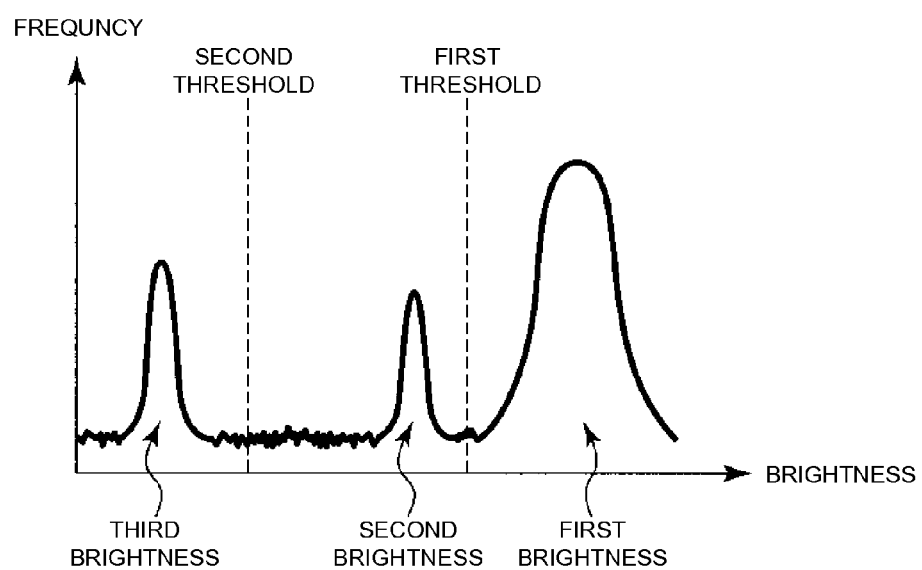
FIG. 9 is a diagram for describing the printed matter according to the first embodiment.

When a histogram as a feature amount is calculated based on the images supplied from the image reading section 20, a histogram as shown in FIG. 9 is calculated. That is, the frequencies concentrate at the second brightness corresponding to the first sub image, the third brightness corresponding to the second sub image, and the first brightness at the other area. Here, the signal processing section 41 sets brightness by which the frequency of the first brightness and the frequency of the second brightness can be discriminated as the first threshold value. In addition, the signal processing section 41 sets brightness by which the frequency of the second brightness and the frequency of the third brightness can be discriminated as the second threshold value.

With the configuration like this, the control section 40 can set a first threshold value and a second threshold value for each image. By this means, the control section 40 can take the influence of stain or the like of the medium 1 into consideration. As a result, the control section 40 can extract the first sub image and the second sub image with higher accuracy. By this means, the printed matter inspection device 100 can determine the authenticity of the medium 1 with higher accuracy.

In addition, in the above-described embodiment, the pattern in which the ink k containing carbon of the black color that is the fourth color is applied to the medium 1 has been referred to as the second sub image (second sub information), but the embodiment is not limited to this configuration.

Figure 10:
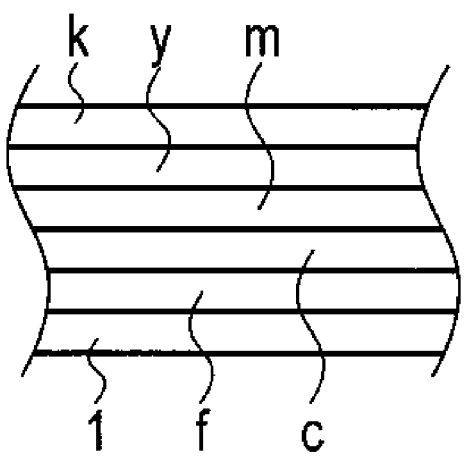
FIG. 10 is a diagram for describing the printed matter according to the first embodiment.

As shown in FIG. 10, in the second sub image, the fluorescent ink f, the ink cyan c, the magenta ink m, the yellow ink y, and the black ink k may be superimposed in this order from the base material 1a side. In this case, the infrared light irradiated from the lighting 21 is absorbed by the ink k, and does not enter into the ink y. The image reading section 20 can detect the third brightness which is darker than the second brightness from the area with the above-described configuration. Even if the printed matter is configured like this, the printed matter inspection device 100 can individually extract the first sub image and the second sub image. In addition, the second sub image is not limited to the configuration of FIG. 10, but the fluorescent ink f may be removed from the configuration shown in FIG. 10.

In addition, in the above-described embodiment, it has been described that the determination section 42 has a configuration to determine the authenticity of the medium 1 based on the comparison result between the first reference image and the first sub image, and the comparison result between the second reference image and the second sub image, but the determination section 42 is not limited to this configuration.

The signal processing section 41 may have a configuration to recognize a character (a first character string) based on the first sub image, and to recognize a character (a second character string) based on the second sub image. In this case, the reference memory 43 previously stores the first reference character string and the second reference character string. The determination section 42 may have a configuration to determine the authenticity of the medium 1, based on the comparison result between the first character string and the first reference character string, and the comparison result between the second character string and the second reference character string.

In addition, the laminated structures of the inks to print the main image, the first sub image, and the second sub image are not limited to the examples described above, respectively. The main image, the first sub image, and the second sub image may be the same color in a human visual sense, and the reflection coefficients thereof of the light of a near infrared wavelength band may be different to each other. For example, the main image can be printed with the ink structure of the area 11c of FIG. 3, the first sub image can be printed with the ink structure of the area 11a, and the second sub image can be printed with the ink structure of the area 11b. In this case, the reference image, or the reference feature amount in the printed matter inspection device 100 is set in accordance with an image to be discriminated. In addition, the number of the sub images embedded into the main image is not two, but may be only one, if necessary.

Accordingly, the embodiment can provide a printed matter having more, such as two, sub information without deteriorating the image quality of a main image, and a printed matter inspection device which can determine authenticity of this printed matter.

In addition, the function described in each of the above-described embodiments is not only configured using hardware, but also may be realized by making a computer read out a program describing each function using software. In addition, each of the functions may be configured by arbitrarily selecting any of the software and the hardware.

Embodiment 2

Next, a printed matter that is a personal authentication medium according to the embodiment 2 will be described. The printed matter of the embodiment 1 has two sub images, but the printed matter of the embodiment 2 has one sub image.

A personal authentication medium according to the present embodiment has a first image formed on a base material having a void portion, and a second image formed within the void portion. The first image is a main image, and the second image is a sub image.

A manufacturing method of a personal authentication medium according to the present embodiment has a process to prepare a support on which an ink image receiving layer is formed, and to form a first image having a void portion on the ink image receiving layer, and a process to form a second image within the void portion.

A manufacturing device of a personal authentication medium according to the present embodiment has an image forming section to form a first image having a void portion and a second image within the void portion on an ink image receiving layer formed on a support, and a thermal transfer section provided at a subsequent stage of the image forming section, to thermally transfer the ink image receiving layer on a base material through the first image and the second image.

In the present embodiment, the first image has a property to absorb infrared ray, and the second image has a property to reflect infrared ray.

Accordingly, when the personal authenticity medium is irradiated with infrared ray, since the first image has the property to absorb the infrared ray, the first image appears blackish, but since the second image reflects the infrared ray, the second image appears whitish. For this reason, it is possible to discriminate whether or not the personal authenticity medium has been altered. In this manner, according to the present embodiment, the personal authenticity medium excellent in security property can be obtained.

The first image and the second image can use images of the same color. Since the colors of the first image and the second image are the same, it becomes more difficult to visually discriminate the first image and the second image, and thereby the security property of the personal authentication medium is improved.

In the present embodiment, the second image can be made to a size within a range from 0.1905 mm to 0.3175 mm, for example, preferably a size within a range from 0.0635 mm to 0.3175 mm. The size of 0.0635 is a size per dot of 400 dpi. 400 dpi is the number of heating element dots arranged in a heating recording head usable in the present embodiment. According to the present embodiment, the first image and the second image are provided on the ink image receiving layer provided on the support, and thereby the image with good quality can be formed. For example, a minute image having a size within a range from 0.0635 mm to 0.3175 mm is formed on the ink image receiving layer, and thereby the image quality thereof becomes excellent. If an image of a size like this is formed on a base material with a rough surface, such as paper, there is a tendency that sufficient image quality can not be obtained.

Figure 11:
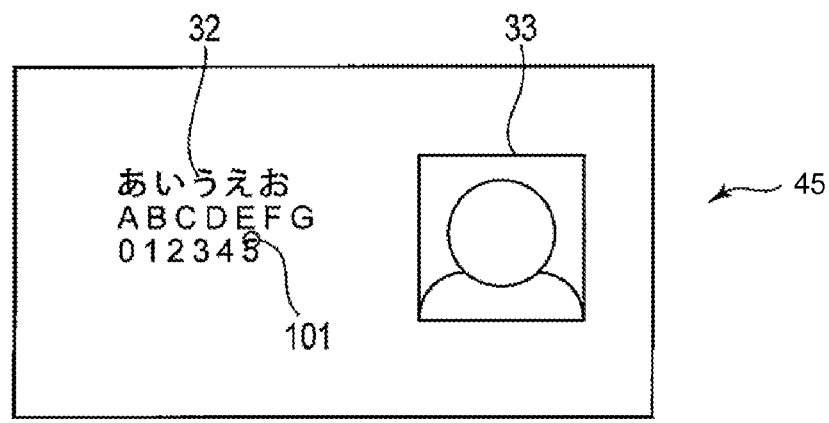
FIG. 11 is a front view showing a configuration of an example of a printed matter according to a second embodiment.
Figure 12:
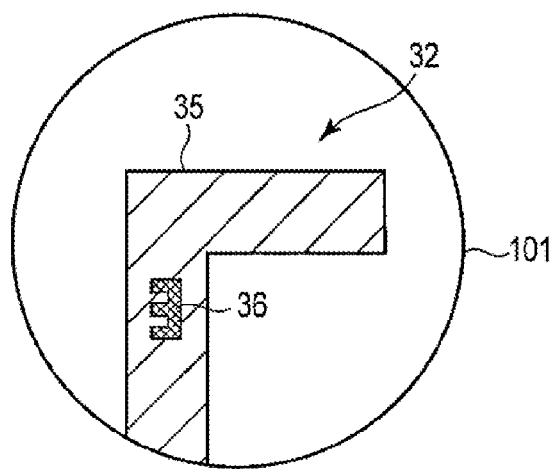
FIG. 12 is a partially enlarged view of FIG. 11.
Figure 13:
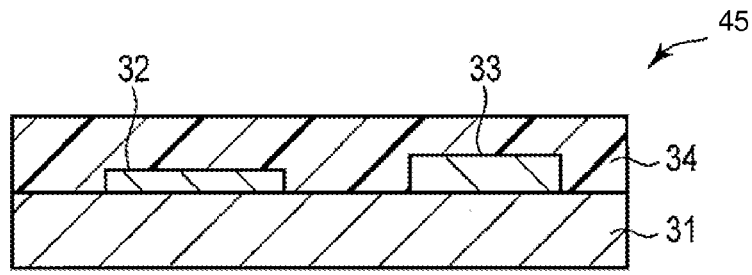
FIG. 13 is a sectional view of FIG. 11.

Hereinafter, a personal authentication medium according to the present embodiment will be described with reference to the drawings. FIG. 11 shows a front view showing a configuration of an example of the personal authentication medium according to the present embodiment. FIG. 12 shows a partially enlarged view of FIG. 11. FIG. 13 shows a sectional view of FIG. 11.

As shown in FIGS. 11-13, a printed matter, that is a personal authentication medium 45, has a base material 31, a character image 32 provided on the base material 31, a photographic image 33 provided on the base material 31, and an optional ink image receiving layer 34 bonded to the base material 31 through the character image 32 and the photographic image 33.

FIG. 12 shows an enlarged view of an area of the character image 32 which is surrounded by a circle 101. As shown in the drawing, the first character image 32 has a first image 35 formed with a black color ink containing an infrared ray absorption pigment. A void portion is formed in the first image 35. In the void portion, a second image 36 formed with a color ink which does not contain an infrared ray absorption pigment is provided. In FIG. 12, for example, a numerical character 5 with a character line width of about 0.4 mm is depicted as the first image 35, and in the line of the numerical character 5, a numerical character 3 is embedded as the second image 36. The numerical character 5 is a black color image formed with a black color ink containing an infrared ray absorption pigment. The numerical character 3 is a black color image formed by mixing a yellow color ink, a magenta color ink, and a cyan color ink which do not contain an infrared ray absorption pigment. The numerical character 3 is a minute image with a size within a range from 0.0635 mm to 0.3175 mm, for example.

Even if the character image 32 composed of the first image 35 and the second image 36 is visually observed, it is extremely difficult to confirm the existence of the second image 36. In addition, even if the character image 32 is observed with a magnifier or a scanner, it is difficult to confirm the existence of the second image 36.

On the other hand, when the character image 32 is irradiated with infrared ray, since the first image 35 absorbs the infrared ray, it looks black, but since the second image reflects the infrared ray, it looks as the color of the base material 1, that is white, in this case. By this means, it is possible to confirm that the personal authentication medium 45 has not been altered.

As shown in FIG. 13, the personal authentication medium 45 of the present embodiment has a configuration in which the ink image receiving layer 34 is further provided on the base material 31 through the character image 32 and the photographic image 33.

Figure 14:
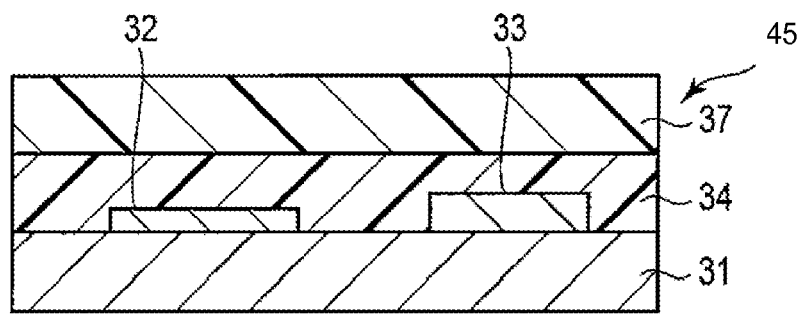
FIG. 14 is a sectional view showing a configuration of another example of a printed matter according to the second embodiment.

In FIG. 14, a sectional view showing a configuration of another example of the personal authentication medium 45 is shown. This personal authentication medium 45 has the same configuration as the personal authentication medium shown in FIG. 13, except that a support 37 is further formed on the ink image receiving layer 34.

Next, a manufacturing method of the personal authentication medium 45 will be shown. The manufacturing method has a process to prepare a support on which an ink image receiving layer has been formed, and to form a first image including a void portion on the ink image receiving layer, and a process to form a second image in the void image. It is possible to further provide a process to apply the base material 31 on the ink image receiving layer 34 through the first and second images. The ink image receiving layer 34 and the support 37 on the ink image receiving layer 34 can function as protective layers of the personal authentication medium. The support 37 can also be peeled off, if necessary. As the process to apply the base material 34 to the ink image receiving layer 34, thermal transfer can be performed. By this means, it becomes possible to sufficiently bond the ink image receiving layer 34 and the base material 31.

Figure 15:
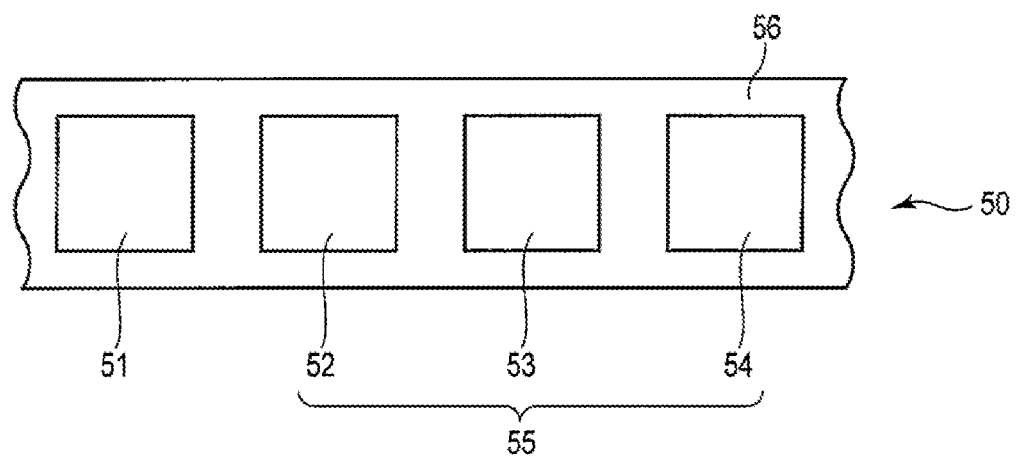
FIG. 15 is a schematic diagram showing an example of a configuration of an ink ribbon usable in the second embodiment.

Next, an ink ribbon which can be used in the present embodiment will be described. FIG. 15 is a schematic view showing an example of a configuration of an ink ribbon.

An ink ribbon 50 includes a belt-like support sheet 56, and a thermal transfer ink layer 51 containing an infrared ray absorption pigment and a thermal transfer color ink layer 55 which does not contain infrared ray absorption material such as an infrared ray absorption pigment, which are surface sequentially provided on the belt-like support sheet 56. The thermal transfer color ink layer 55 has a yellow color ink layer 52, a magenta color ink layer 53, and a cyan color ink layer 54 which are surface sequentially provided on the belt-like support sheet 56. The first image can be formed with the thermal transfer ink layer 51, and the second image can be formed with the thermal transfer color ink layer 55.

Figure 16:
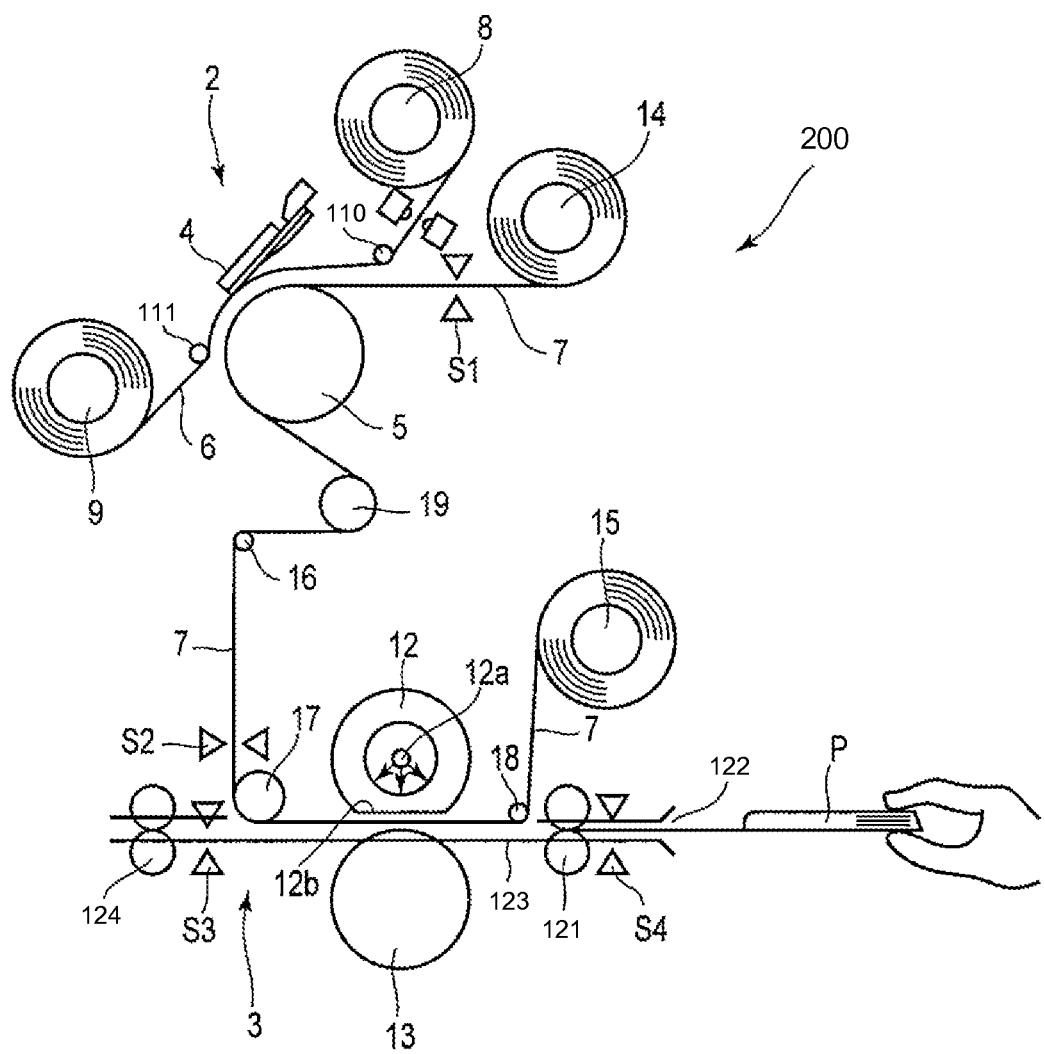
FIG. 16 schematically shows an example of a configuration of a manufacturing device of a printed matter according to the second embodiment.

Next, a manufacturing device of a personal authentication medium will be described. FIG. 16 schematically shows an example of a configuration of a manufacturing device of a personal authentication medium according to the present embodiment. This manufacturing device 200 of a personal authentication medium simultaneously performs recording of a color image and character information, and forming of a protective film on the recording face, for a personal authentication medium main body such as cards and bankbooks.

In FIG. 16, the manufacturing device 200 of a personal authentication medium is configured to be provided with a recording section which functions as recording means, and a transfer section 3 which functions as transfer means provided below this recording section 2.

The recording section 2 is provided with a line type thermal head 4 composed of a plurality of heating elements arranged in line, a platen roller 5 arranged opposite to the thermal head 4, and so on. Between the thermal head 4 and the platen roller 5, a color ink ribbon 6 is interposed, in which respective color ink layers composed of a yellow ink layer (Y) that does not contain an infrared ray absorption pigment, a magenta ink layer (M) that does not contain an infrared ray absorption pigment, a cyan ink layer (C) that does not contain an infrared ray absorption pigment, and a black ink layer (K) that contains an infrared ray absorption pigment are sequentially provided on one surface of a film-shaped base material.

The platen roller 5 functions as supply means to supply an intermediate transfer ribbon 7 at a prescribed speed, in which image receiving layers is provided on one surface of a film-shaped base material.

Regarding the color ink ribbon 6, one end portion thereof is wound around a delivery shaft 8, and the other end portion thereof is wound around a winding shaft 9. At least one of the delivery shaft 8 and the winding shaft 9 can independently be driven in both forward and reverse directions. Middle portions of the color ink ribbon 8 delivered from the delivery shaft 8 are wound over guide shafts 110, 111.

The transfer section 3 is provided with a heat roller 12 as a transfer roller, a backup roller 13 arranged opposite to the heat roller 12, and so on. The heat roller 12 is provided with a heater 12a for heating and a cut surface 12b with a circumference cut out partly. And, between the heat roller 12 and the backup roller 13, the intermediate transfer ribbon 7 which functions as an intermediate transfer medium is interposed.

Regarding the intermediate transfer ribbon 7, one end side thereof is wound around a delivery shaft 14 provided at the upper portion side of the recording section 2, and the other end side thereof is wound around a winding shaft 15 provided at the lower portion side of the recording section 2. At least one of the delivery shaft 14 and the winding shaft 15 can independently be driven in both forward and reverse directions. In addition, the delivery shaft 14 and the winding shaft 15 function as supply means to supply the intermediate transfer ribbon 7 toward the recording section 2. Middle portions of the intermediate transfer ribbon 7 delivered from the delivery shaft 14 are wound over guide shafts 16-18, and a tension roller 19, and thereby the intermediate transfer ribbon 7 is kept to have an approximately constant tension.

The transfer section 3 is provided with conveying roller pairs 120, 121. The conveying roller pair 120 is arranged at a more upstream side than the heat roller 12 in the conveying direction. In addition, the conveying roller pair 121 is arranged at a more downstream side than the heat roller 12 in the conveying direction.

The conveying roller pairs 120, 121 convey a recording medium (in this embodiment, a passbook for personal authentication with a recording page being opened) P inserted from a bankbook insertion port 122, to a prescribed transfer position by the heat roller 12 along a conveying path 123. That is, these conveying roller pairs 120, 121 convey the bankbook P so that the transfer start position in the recording page of the bankbook P matches with the transfer position by the heat roller 12.

The transfer section 3 is provided with sensors S1, S2 which function as detection means arranged along the supplying path of the intermediate transfer ribbon 7. The sensors S1, S2 optically detect a bar mark arranged at the outside of an effective area of the intermediate transfer ribbon 7, and output detection signals thereof.

The transfer section 3 is provided with sensors S3, S4 which function as detection means arranged along the conveying path 123 of the bankbook P. The sensors S3, S4 optically detect presence or absence of the bankbook P inserted from the bankbook insertion port 122, and output detection signals thereof.

At the recording section 2, the first image and the second are formed on the image receiving layer of the intermediate transfer ribbon 7 by the ink ribbon 6 by heating thermal head 4.

At transfer section 3, the first image and the second image formed on the image receiving layer 7 of the intermediate middle transfer ribbon 7 and the image receiving layer are transferred to the record page of the bankbooks P by the heat roller 12, According to the present embodiment, a personal authenticity medium excellent in security property can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printed matter, comprising:
   a base material which reflects light of an infrared wave length band;
   a main image which is printed on the base material with a first ink;
   a first sub image embedded in the main image which has the same color as a color of the main image in a human visual sense, and is printed with a second ink to absorb light of the infrared wavelength band by a first absorption coefficient; and
   a second sub image embedded in the main image which has the same color as the color of the main image in a human visual sense, and is printed with a third ink to absorb light of the infrared wavelength band by a second absorption coefficient;
   wherein the first ink is a visible ink which transmits light of the infrared wavelength band, and the visible ink includes a cyan ink, a magenta ink and a yellow ink each transmits light of the infrared wavelength band, which are printed in a superimposed manner,
   wherein the second ink includes a fluorescent ink which absorbs light of the infrared wavelength band by a predetermined absorption coefficient and the visible ink, the fluorescent ink and the visible ink are printed in a superimposed manner, and
   wherein the third ink is a black ink containing carbon to absorb light of the infrared wavelength band by the second absorption coefficient.

2. The printed matter according to claim 1, wherein the main image is printed as a character.

* * * * *